United States Patent Office 3,073,866
Patented Jan. 15, 1963

---

3,073,866
PROCESS OF PREPARING HYDROXY-ALKOXY ARYLOPHENONES
Lester N. Stanley, Delmar, N.Y., assignor to General Aniline & Film Corporation, New York, N.Y., a corporation of Delaware
No Drawing. Filed Sept. 16, 1959, Ser. No. 840,246
4 Claims. (Cl. 260—591)

This invention relates to hydroxy-alkoxy arylophenones and particularly to an improved process of preparing the same.

In recent years, great interest has arisen in polyhydroxy benzophenones. These compounds are usually prepared by one of several methods. One method consists of fusing fluoroscein chloride with caustic soda at 270–280° C. The yields obtained are minutely small and hence this method was never adapted for commercial production. Another method consists of condensing 2,4-diacetoxybenzontitrile and resorcinol in the presence of hydrochloric acid and zinc chloride followed by hydrolysis in acid solution to yield a hydroxy benzophenone. The disadvantage of this method is the need to work with anhydrous ether which is not feasible under commercial conditions of manufacture. A commercially acceptable method consists in condensing resorcinol dimethyl ether with phosgene in the presence of aluminum chloride followed by demethylation as described in United States Patent 2,694,729. Demethylation of the condensed product is difficult to regulate, i.e., 2,2′,4,4′-tetrahydroxybenzophenone is of low purity and the yield is exceedingly low ranging from 20 to 25% maximum. Despite the fact that this method has been used commercially, the low yield makes it unattractive for large scale commercial operation. Moreover, the price charged for the final product, because of the low yields obtained, is unusually high.

In order to overcome the problem of regulating demethylation, an attempt was made to condense β-resorcylic acid with resorcinol while employing aluminum chloride as a catalyst. The final product, i.e., 2,2′,4,4′-tetrahydroxybenzophenone, contained considerable tar, and on isolation also contained a considerable amount of xanthone as an impurity and was unsuitable as an ultraviolet absorber. A further attempt was made by replacing the aluminum chloride by zinc chloride and phosphorus oxychloride as catalysts. The final reaction product sets up to a hard concrete-like mass which is impossible to stir and therefore very difficult to isolate by drowning from the reaction mixture without local overheating and resultant decomposition to xanthone and tarry by-products. Even though the latter modification may be workable in small laboratory quantities, it is not suitable for large scale commercial production.

This method was supplanted by the method described in my United States Patent 2,854,485. According to this method poly-hydroxybenzophenones are prepared in good yields and of a high degree of purity by condensing an o-hydroxy aryl carboxylic acid with a phenol in the presence of zinc chloride and phosphorus oxychloride as catalysts and in the presence of aqueous phosphoric acid as solvent. Contrary to the usual condensation reactions employing aluminum chloride, zinc chloride and the like as catalysts wherein the reactions normally require an anhydrous medium, I found that between 2–20% of water must be present for the reaction to run satisfactorily so as to give good yields of products of high degree of purity. If the medium is anhydrous, frequently the reaction mass becomes very viscous, sets up to a solid and is not workable.

I have now found that hydroxy-alkoxy arylophenones can be readily prepared in consistently better yields and of higher degree of purity by condensing an aryl carboxylic acid with a phenol or an alkyl ether of phenol in the presence of zinc chloride and phosphorus trichloride as catalysts and in the presence of a phosphoric acid which analyzes 95–106% $H_3PO_4$ as a solvent. This particular phosphoric acid which has a calculated $H_3PO_4$ content of 95–106% is prepared by diluting commercial polyphosphoric acid with water or less concentrated phosphoric acid to a calculated $H_3PO_4$ content of 95–106%. For ease of expression, the term polyphosphoric acid will be employed when phosphoric acid which analyzes 95–106% $H_3PO_4$ content is intended, and it is to be understood that throughout the remainder of this application, the term polyphosphoric acid means polyphosphoric acid which has been so diluted to a $H_3PO_4$ content of 95–106% with water or dilute phosphoric acid. By proper selection of optimum reaction conditions, depending on the nature of the aryl carboxylic acid involved, the yields of the products obtained, when using this method, are consistently approximately 75–85% or higher of theory, whereas the yields of the products obtained when an o-hydroxy aryl carboxylic acid is condensed with a phenol in the presence of zinc chloride and phosphorus oxychloride as catalysts in the presence of aqueous phosphoric acid as a solvent, according to the method of my U.S. Patent 2,854,485, are consistently of approximately 68–75% of theory. The nature of the aryl carboxylic acid employed is important in the choice of exact reaction conditions since the o-hydroxy carboxylic acids are more sensitive to the lower $H_3PO_4$ concentrations, i.e., below about 100%, whereas other acids, such as p-hydroxybenzoic acid, give excellent results over a wider range of $H_3PO_4$ concentrations, i.e. 95–106%. This consistent improvement in yield is quite important economically in the commercial manufacture of an expensive product. Furthermore, the products obtained by the instant process are consistently of better quality than the products produced by the method of my aforementioned patent. In particular, the shades are lighter and therefore more preferable, especially in applications where they are to be incorporated in a transparent or colorless medium such as a plastic or lacquer film.

The shades of the products obtained by this method have low APHA readings which are usually in the range of 5–20. APHA readings are comparisons of a 0.025% solution of the UV agent in methanol against standard Hellige Disks which represent the color of a Pt—Co standard solution as prepared by the American Public Health Association (APHA). Details of this test are available in "Standard Methods for the Examination of Water and Sewage," 9th ed., 1946, pp. 14–15, published by the APHA.

It is quite surprising that hydoxy arylophenones can be produced in good quality and yield when an aryl carboxylic acid is reacted with a phenol or an alkyl ether of phenol in the presence of zinc chloride and phosphorus trichloride and phosphoric acid of a 95–106% calculated content, since when I tried to react β-resorcylic acid with resorcinol employing zinc chloride and phosphorus trichloride in place of phosphorus oxychloride as catalysts no reaction occurred. In the reaction of an aryl carboxylic acid with a phenol or an alkyl ether of phenol in the presence of zinc chloride and phosphorus trichloride it is most unexpected that the addition of phosphoric acid of a 95–106% calculated content alloys the reaction to run efficiently when, in fact, no reaction occurs without the addition of the said phosphoric acid.

Another feature is that phosphorus trichloride becomes an extremely active catalyst when used in this condensation system with zinc chloride and aforesaid phosphoric acid. As a result, considerably less phosphorus trichloride is necessary in contrast to the amount of phosphorus oxychloride generally employed in this type of reaction.

Generally, condensations of this type are accompanied by both ester formation and o-condensation together with varying amounts of colored or tarry by-products. In U.S.P. 2,822,378, benzoic acid is reacted with phenol in the presence of polyphosphoric acid to produce esters. In Snyder et al., JACS 77, 364–5 (1955) it is clearly indicated that in condensations of this nature the yields of the p-condensation products are low and are attended by both ester formation and o-condensation. Yet I consistently obtain 90–100% yields of p-substituted condensation products which have high degrees of purity when the p-position of the phenol or alkyl ether of phenol is unsubstituted.

Further objects and advantages will become more clearly manifest from the following description. The parts given are by weight.

In practicing the invention, 1 part of an aryl carboxylic acid, an approximately (molecular) equivalent of a phenol or an alkyl ether of a phenol, 1–4 parts of zinc chloride, 3–15 parts of phosphoric acid which has a calculated phosphoric acid ($H_3PO_4$) content of 95–106% and 0.3–5.0 parts of phosphorus trichloride are combined, heated slowly to and maintained at 45–75° C. for 3–24 hours. The charge is then drowned in an ice and water mixture, filtered and purified in the usual manner by solution, clarification and recrystallization. The proportions of the reactants, i.e., aryl carboxylic acid and phenol or an alkyl ether of a phenol are not critical. In fact, a slight excess up to about 10% of either one may be employed to give final products of high yields and of high degree of purity. Optimum results are obtained if the ratio of aryl carboxylic acid to phosphorus trichloride is about 1 part of the former to about 1–2 parts of the latter, and 1 part of the aryl carboxylic acid to 2–4 parts of zinc chloride.

Optimum results also depend on the temperature at which the reaction is run. At lower temperatures, the reaction time is longer but the quality of the product is somewhat better than if a higher temperature is used.

The usual method of carrying out the invention is to combine the aryl carboxylic acid, the phenol or an alkyl ether of a phenol, the zinc chloride and the phosphoric acid at about room temperature, i.e., 25–30° C., warm to 45–75° C. slowly while gradually adding the phosphorus trichloride over a period of 1–4 hours and maintain the charge at 45–75° C. for 3–24 hours, followed by isolation and purification.

An alternative method which has been found to have some advantages consists in combining the aryl carboxylic acid, the phenol or the alkyl ether of a phenol, the zinc chloride, the phosphoric acid and the phosphorus trichloride at about room temperature, followed by a gradual heating to 45–75° C. at the rate of about 5° C. per hour, followed by maintenance of such temperature for 3–24 hours. The charge is then isolated and purified in the usual manner.

In carrying out this invention it has been found that the phosphoric acid content is quite critical especially in the case of o-hydroxy aryl carboxylic acids. This is demonstrated in the following Charts I and II, Chart I which shows the yield of poly-hydroxyarylophenone when employing an o-hydroxy aryl carboxylic acid, e.g., β-resorcylic acid in relation to the percentage of phosphoric acid in the polyphosphoric acid:

CHART I

| Concentration of $H_3PO_4$ in polyphosphoric acid in percent: | Yield of 2,2′,4,4′-tetrahydroxybenzophenone in percent of theoretical |
|---|---|
| 94 | 19.5 |
| 97 | 27 |
| 98.6 | 30.8 |
| 100 | 60 |
| 101.1 | 63.2 |
| 103 | 78.6 |
| 103 | 82.6 |
| 103 | 85 |
| 104.4 | 55.6 |
| 106 | 51.1 |

These experiments were carried out as follows: 317 grams of polyphosphoric acid of varying concentrations, 33.5 grams of β-resorcylic acid, 25.2 grams of resorcinol and 67 grams of zinc chloride were charged together and heated to 55° C. 38 grams of phosphorus trichloride was dropped in slowly over a period of 1–⅔ hours while maintaining the temperature at about 55° C. Heating was continued at 55–60° C. for 10 hours. The charge was drowned in several liters of ice and water, filtered and washed with cold 2½% aqueous sodium bicarbonate solution. After treatment with the sodium bicarbonate solution, the charge was dissolved in hot water made slightly acid with HCl, treated with Nuchar and a very small amount of zinc dust, filtered, cooled, crystallized, filtered, dried and weighed.

The various concentrations of polyphosphoric acids were obtained by diluting commercially available polyphosphoric acid to the desired concentration with water or more dilute phosphoric acid.

The chart clearly shows that at lower concentrations of phosphoric acid up to about 100%, the yields are very poor, then there is an optimum concentration at which consistently high yields are obtained, i.e., at about 103%, followed by a sharp decrease in yield:

CHART II

| | | |
|---|---|---|
| 30.0 g. p-hydroxybenzoic acid. | 30.0 g. p-hydroxybenzoic acid. | 30.0 g. p-hydroxybenzoic acid. |
| 23.9 g. resorcinol | 23.9 g. resorcinol | 23.9 g. resorcinol. |
| 67.0 g. $ZnCl_2$ | 67.0 g. $ZnCl_2$ | 67.0 g. $ZnCl_2$ |
| 317.0 g. 103% $H_3PO_4$ | 317.0 g. 97% $H_3PO_4$ | 317.0 g. 97% $H_3PO_4$. |
| 38. 0 g. $PCl_3$ (1.3 pts/1 pt. p-hydroxybenzoic acid). | 38.0 g. $PCl_3$ (1.3 pts/1 pt. p-hydroxybenzoic acid). | 51.0 g. $PCl_3$ (1.7 pts/1 pt. p-hydroxybenzoic acid). |
| Obtained: 50 g. product (100% yield), APHA 15. | Obtained: 46 g. product (92% yield), APHA 30–35. | Obtained: 49 g. product (98% yield), APHA 10. |

As stated above and demonstrated in Chart I, in the case of the o-hydroxy aryl carboxylic acid, e.g., resorcylic acid the phosphoric acid content is exceptionally critical. Chart II further demonstrates the sensitivity of the reaction, in the case of p-hydroxybenzoic acid this time in relation to the phosporic acid concentration vs. the phosphorus trichloride concentration.

It should be pointed out that in the reaction illustrated by Chart I (ortho hydroxy acid) the sensitivity at lower $H_3PO_4$ concentrations is very great especially from the viewpoint of yields. The surprising feature of my recent work as illustrated by the reaction of Chart II (para hydroxy acid) is that relatively good yields are still obtainable at the lower $H_3PO_4$ concentrations in contrast to Chart I, i.e., 92% yield versus 27% yield.

It was stated above and Chart II demonstrates that when 95–106% phosphoric acid is employed, in order to obtain maximum results, that the phosphorus trichloride concentration should be increased towards the maximum as set by this invention.

The aryl carboxylic acids are characterized by the following general formulae:

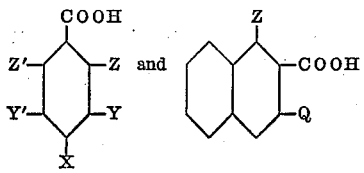

wherein X represents hydrogen, hydroxy, alkyl such as methyl, ethyl, propyl, butyl, nonyl and octadecyl; alkoxy, such as methoxy, ethoxy, propyloxy, butyloxy, octyloxy and octadecyloxy; and the Y's represent hydrogen, hydroxy, alkyl of 1 to 4 carbon atoms, and alkoxy of 1 to 18 carbon atoms; Z represents hydrogen, hydroxy, alkyl of 1 to 4 carbon atoms, and alkoxy of from 1 to 18 carbon atoms; Z' represents hydrogen, alkyl of 1 to 4 carbon atoms and alkoxy of from 1 to 18 carbon atoms, and Q represnts either hydrogen or hydroxy. Preferably there are at the most only three substituents (other than hydrogen) in the X, Y and Z functions.

As illustrative examples of aryl carboxylic acids which are condensed with a phenol or an alkyl ether of a phenol may be mentioned:

Salicylic acid
3-Methylsalicylic acid
3-Methoxysalicyclic acid
2,4-Dihydroxybenzoic acid
4-Methoxysalicylic acid
4-Butoxysalicylic acid
4-Ethoxysalicylic acid
4-Methylsalicylic acid
2,3,4-Trihydroxybenzoic acid
1-Hydroxy-2-naphthoic acid
3-hydroxy-2-naphthoic acid
Benzoic acid
4-Isopropyl-3-hydroxy benzoic acid
o-, m- and p-Toluic acids
2,4- and 2,5-Dimethylbenzoic acids
p-Hydroxybenzoic acid
p-Anisic acid
Pyrocatechuic acid
4-Hydroxy-m-anisic acid
3-Hydroxy-p-anisic acid
3,4-Dimethoxybenzoic acid
4-Hydroxy-o-toluic acid
4-Hydroxy-m-toluic acid The phenols are characterized by the following general formula:

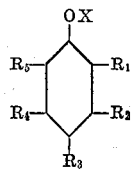

wherein X represents hydrogen and alkyl of 1 to 18 carbon atoms, such as methyl, ethyl, propyl, butyl, octyl, nonyl, dodecyl and octadecyl, and wherein the R's represent hydrogen, hydroxy, alkyl of 1 to 18 carbon atoms, alkoxy such as methoxy, ethoxy, propyloxy, butyloxy, octyloxy, octadecyloxy, and halogen such as chlorine or bromine. Preferably no more than two of the R functions should contain substituents other than hydrogen.

As examples of phenols and alkyl ethers of phenols which may be employed, the following are illustrative:

Phenol
4-chlorophenol
Resorcinol
Resorcinol monomethyl ether
Resorcinol monoethyl ether
Resorcinol monooctyl ether
Resorcinol monooctadecyl ether
4-chlororesorcinol
4-bromoresorcinol
Hydroquinone
Hydroquinone monomethyl ether
Hydroquinonedimethyl ether
o-Cresol
m-Cresol
p-Cresol
Anisole
Phenetole
o-Chlorophenol
m-Chlorophenol
Catechol
Guaiacol
Pyrogallol
3,5-xylenol
m-Octylphenol
m-Nonylphenol
Di-nonylphenol
p-Nonylphenol The improved process will be more fully described in conjunction with the following examples. It is to be noted, however, that these examples are merely illustrative of the invention and are not to be limited by the details set forth therein.

*Example I*

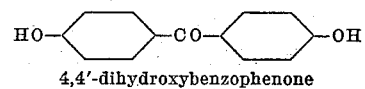

4,4'-dihydroxybenzophenone

Into a flask was charged 30 grams of p-hydroxybenzoic acid, 20.4 grams of phenol, 67 grams of zinc chloride and 317 grams of phosphoric acid having a phosphoric acid content of approximately 103%, produced by mixing together 60 parts polyphosphoric acid and 40 parts 85% phosphoric acid. The slurry was heated with stirring to 40° C. Over a 1½ hour period 38 grams of phosphorus trichloride was added. It was heated slowly to, and held at 60° C. for 16 hours, drowned to 600 cc. volume in cold water, filtered, washed with cold water, then 2½% aqueous sodium bicarbonate solution, then water and finally dried. A yield of 42 grams (90% theory) was obtained of a product having a M.P. 210.4–212° C. and an APHA color rating of 5.

*Example II*

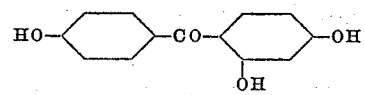

2,4,4'-trihydroxybenzophenone

Into a flask was charged 30 grams of p-hydroxybenzoic acid, 23.9 grams of resorcinol, 67 grams of zinc chloride and 317 grams of phosphoric acid (103%). The slurry was heated to 40° C. Over a 2-hour period 38 grams of phosphorus trichloride was added. It was heated slowly to and held at 60° for 14 hours, drowned to 600 cc. volume in cold water, filtered, washed with cold water and finally dried. It is to be noted that the product was sufficiently pure, that no additional purification was necessary, even to the sodium bicarbonate wash of Example I.

50 grams of product (100% theory), M.P. 203.4–204° C., and an APHA color value 15, was obtained.

*Example III*

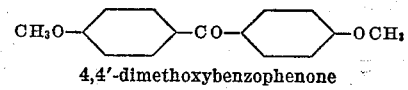

4,4'-dimethoxybenzophenone

Into a flask was charged 33 grams of p-anisic acid, 23.4 grams of anisole, 67 grams of zinc chloride and 317 grams of phosphoric acid (103%). Over a 1½ hour period 38 grams of phosphorus trichloride was added. It was heated slowly up to 60° and held at 60° for 17 hours, drowned to 600 cc. volume in cold water, filtered, washed with cold water, then 2½% aqueous sodium bicarbonate solution, then cold water and finally dried. The yield was 52.5 grams (100% of theory), the APHA reading was 5.

*Example IV*

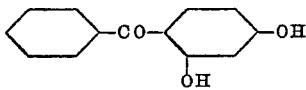

2,4-dihydroxybenzophenone

Into a flask was charged 26.5 grams of benzoic acid, 23.9 grams of resorcinol, 67 grams of zinc chloride and 320 grams of phosphoric acid (103%). The mixture was heated to 40° C. In 1½ hours, 38 grams of phosphorus trichloride was added, then heated to 60° C., slowly and maintained at that temperature for 16 hours. It was finished as in Example I, yielding 42 grams (91% of theory), of a product having M.P. 142.6–144.2° C.

*Example V*

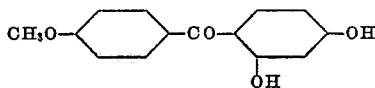

2,4-dihydroxy-4'-methoxybenzophenone

The reaction was carried out exactly as in Example I, with the exception that the p-hydroxybenzoic acid was replaced by 33 grams of p-anisic acid and the phenol by 23.9 grams of resorcinol. 52 grams of product (98% of theory) was obtained, M.P. 163.4–164.8° C.

*Example VI*

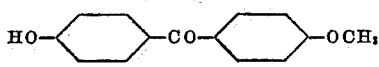

2-hydroxy-4-methoxybenzophenone

The reaction was carried out exactly as in Example I, except that the phenol was replaced by 23.4 grams of anisole. The crude product was dissolved in 200 cc. of water and 125 cc. of isopropanol (to which was added 5 grams of zinc dust and 2 grams of Nuchar) filtered, cooled, filtered and finally dried. 45 grams of product (91% of theory) was obtained, M.P. 150.6–151.8° C., APHA reading of 5.

*Example VII*

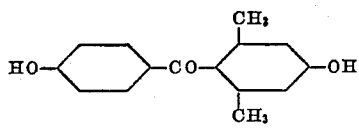

4,4'-dihydroxy-2,2'-dimethylbenzophenone

This was carried out exactly as in Example I, except that 26.5 grams of 3,5-xylenol was substituted for the phenol and the temperature was raised to 70° and held there for 16 hours. 47 grams of product (90% of theory) was obtained, having an APHA reading of 20.

*Example VIII*

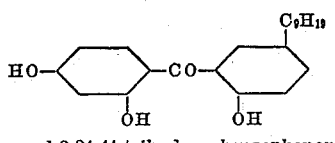

5-nonyl-2,2',4'-trihydroxybenzophenone

Into a flask was charged 134 grams of β-resorcylic acid, 190 grams of p-nonylphenol and 1268 grams of phosphoric acid having a phosphoric acid content of approximately 103%. The slurry was heated with stirring to 40–45° C. Over a 2 hour period, 152 grams of phosphorus trichloride was added. It was heated slowly to 60° C., and held there for 16 hours, then drowned in ice. The material was washed several times with warm water, then extracted with 500 cc. ethylene dichloride. The solvent was distilled. Yield 73.5%.

*Example IX*

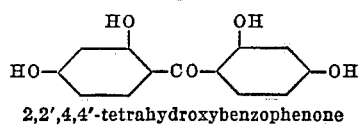

2,2',4,4'-tetrahydroxybenzophenone

Into a flask was charged 317 grams of a mixture analyzing 103% $H_3PO_4$ prepared by mixing 190 grams of commercial polyphosphoric acid and 127 grams of 85% phosphoric acid. To this was added, with constant stirring to a uniform slurry, at 25–30° C. 33 grams of β-resorcylic acid, 29.5 grams of resorcinol and 67 grams of zinc chloride. This slurry was heated to 60° C. in 1 hour. 38 grams of phosphorus trichloride was added in 1½ hours. After the phosphorus trichloride was added, the charge was held at 60° C. for 8½ hours. It was then drowned in several liters of ice and water, filtered and washed with cold 5% aqueous sodium bicarbonate solution. After treatment with the sodium bicarbonate solution, the charge was dissolved in hot water made slightly acid with HCl, treated with Nuchar and a very small amount of zinc dust, filtered, cooled, crystallized and filtered. 45 grams of 2,2',4,4'-tetrahydroxybenzophenone, M.P. 200–201° C., was obtained. This corresponds to a yield of 85% of theory.

*Example X*

317 grams of polyphosphoric (103% $H_3PO_4$ content), 33.5 grams of β-resorcylic acid, 25.2 grams of resorcinol and 67.0 grams of zinc chloride were stirred together at room temperature, i.e., 27° C., until a uniform slurry was formed. Over a 2-hour period wherein the temperature rose from the initial 27° C. to 37° C., 38 grams of phosphorus trichloride was added. The temperature was then increased at the rate of about 5° per hour for 4 hours, until about 60° C. was attained. The charge was maintained at 60° C. for 16 hours, after which it was drowned in several liters of ice and water, filtered, and washed with cold 5% aqueous sodium bicarbonate solution. After treatment with the sodium bicarbonate solution, the charge was dissolved in hot water made slightly acid with HCl, treated with Nuchar and a very small amount of zinc dust, filtered, cooled, crystallized and filtered. The yield was 42 grams (78.6% of theory) of very light yellow crystals of 2,2',4,4'-tetrahydroxybenzophenone.

*Example XI*

Example X was repeated with the exception that the temperature was raised to 50° C. instead of 60° C. It was held at 50° C. for 24 hours and then finished as in Example X. A yield of 43.8 grams of 2,2',4,4'-tetrahydroxybenzophenone was obtained, which corresponds to a yield of 82% of the theoretical.

*Example XII*

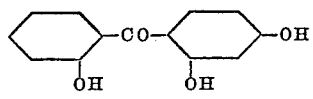

2,2',4-trihydroxybenzophenone

Example X was repeated with the exception that the 33.5 grams of β-resorcylic acid was replaced by 30 grams of salicylic acid. After treatment with sodium bicarbonate solution, as in Example X, the charge was dissolved in hot isopropanol, treated with Nuchar with a very small amount of zinc dust, filtered, cooled, crystallized and filtered. Pale yellow crystals of 2,2',4-trihydroxybenzophenone were obtained.

*Example XIII*

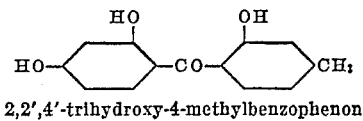

2,2',4'-trihydroxy-4-methylbenzophenone

Example X was repeated with the exception that the 33.5 grams of β-resorcyclic acid were replaced by 32.2 grams of 4-methylsalicyclic acid. The final recrystallization was made from hot isopropanol in place of acidified water. Pale yellow crystals of 2,2',4'-trihydroxy-4-methylbenzophenone were obtained.

*Example XIV*

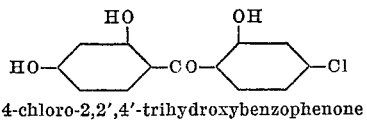

4-chloro-2,2',4'-trihydroxybenzophenone

Example X was repeated with the exception that the 33.5 grams of β-resorcyclic acid was replaced by 37.6 grams of 4-chlorosalicyclic acid. The final recrystallization was made from hot isopropanol in place of acidified water. Pale yellow crystals of 4-chloro-2,2',4'-trihydroxybenzophenone were obtained.

*Example XV*

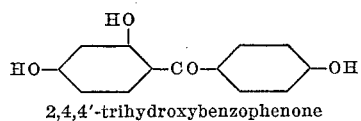

2,4,4'-trihydroxybenzophenone

Example X was repeated with the exception that the 25.2 grams of resorcinol were replaced by 21.6 grams of phenol. The final recrystallization was made from hot isopropanol in place of acidified water. Crystals of 2,4,4'-trihydroxybenzophenone were obtained.

*Example XVI*

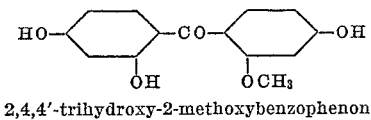

2,4,4'-trihydroxy-2-methoxybenzophenone

Example X was repeated with the exception that the 25.2 grams of resorcinol were replaced by 28.3 grams of resorcinol monomethyl ether. The final recrystallization was made from hot isopropanol in place of acidified water. Yellow crystals of 2,4,4'-trihydroxy-2'-methoxy benzophenone were obtained admixed with some isomeric 2,2',4-trihydroxy-4'-methoxy benzophenone.

*Example XVII*

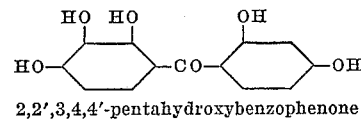

2,2',3,4,4'-pentahydroxybenzophenone

Example X was repeated, with the exception that the 25.2 grams of resorcinol were replaced by 28.4 grams of pyrogallol. Yellow crystals of 2,2',3,4,4'-pentahydroxybenzophenone were obtained. Since this product is water-soluble, it may be recrystallized from water.

*Example XVIII*

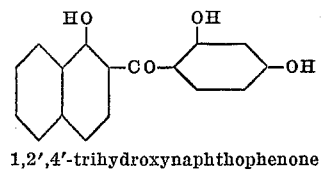

1,2',4'-trihydroxynaphthophenone

Example X was repeated with the exception that the 33.5 grams of β-resorcyclic acid were replaced by 41 grams of 1-hydroxy-2-naphthoic acid. The final recrystallization was made from hot isopropanol in place of acidified water. Yellow crystals of 1,2',4'-trihydroxynaphthophenone were obtained.

*Example XIX*

Example X was again repeated with the exception that the 33.5 grams of β-resorcyclic acid were replaced by 37 grams of 2,3,4-trihydroxybenzoic acid. Yellow crystals of 2,2',3,4,4'-pentahydroxybenzophenone were obtained.

This application is a continuation-in-part of my application Serial No. 743,478 filed on June 20, 1958, now United States Patent 2,921,962.

I claim:

1. The process of preparing hydroxy-alkoxy arylophenones which comprises condensing a hydroxy aryl carboxylic acid with an alkyl ether of phenol in the presence of a mixture of phosphorus trichloride and zinc chloride as a catalyst and in the presence of phosphoric acid which has a phosphoric acid content of 95–106% as a solvent, and at a temperature ranging from 45–75° C., and isolating and purifying the said hydroxy-alkoxy arylophenone.

2. The process of preparing hydroxy-alkoxy arylophenones which comprises condensing at a temperature of 45–75° C., 1 part by weight of a hydroxy aryl carboxylic acid with an approximately molecular equivalent weight of an alkyl ether of phenol in the presence of a catalyst mixture consisting of 0.3–5.0 parts by weight of phosphorus trichloride and 1–4 parts by weight of zinc chloride, in the presence of 3–15 parts by weight of phosphoric acid as a solvent which has a phosphoric acid content of 95–106%, and isolating and purifying the said hydroxy-alkoxy arylophenone.

3. The process according to claim 1 wherein the said alkyl ether of phenol is anisole.

4. The process according to claim 1 wherein the said hydroxyarylcarboxylic acid is p-hydroxybenzoic acid.

References Cited in the file of this patent

UNITED STATES PATENTS 2,921,862    Stanley _____ Jan. 19, 1960